(12) United States Patent
Heger

(10) Patent No.: US 6,568,264 B2
(45) Date of Patent: May 27, 2003

(54) WIRELESS SWIMMING POOL WATER LEVEL SYSTEM

(76) Inventor: Charles E. Heger, 21050 Saratoga Hills Rd., Saratoga, CA (US) 95070

( * ) Notice: Subject to any disclaimer, the term of this patent is extended or adjusted under 35 U.S.C. 154(b) by 0 days.

(21) Appl. No.: 09/792,456

(22) Filed: Feb. 23, 2001

(65) Prior Publication Data

US 2002/0116999 A1 Aug. 29, 2002

(51) Int. Cl.[7] .......................... G01F 23/00; G08B 21/00
(52) U.S. Cl. ......................................... 73/304; 340/618
(58) Field of Search ..................... 73/304 C; 340/618

(56) References Cited

U.S. PATENT DOCUMENTS

| | | | | |
|---|---|---|---|---|
| 3,010,320 A | * | 11/1961 | Sollecito ................... 73/304 C |
| 3,025,464 A | * | 3/1962 | Bond ....................... 73/304 C |
| 3,862,571 A | * | 1/1975 | Vogel ...................... 73/304 C |
| 3,901,079 A | * | 8/1975 | Vogel ...................... 73/304 C |
| 3,939,360 A | * | 2/1976 | Jackson ..................... 137/392 |
| 4,002,996 A | * | 1/1977 | Klebanoff et al. ............. 331/65 |
| 4,099,167 A | * | 7/1978 | Pomerantz et al. .......... 340/620 |
| 4,459,584 A | | 7/1984 | Clarkson .................... 340/624 |
| 4,470,008 A | | 9/1984 | Kato ......................... 324/61 R |
| 4,523,465 A | | 6/1985 | Fasching et al. ........... 73/290 V |
| 4,817,217 A | | 4/1989 | Lively ........................... 4/508 |
| 5,708,424 A | | 1/1998 | Orlando et al. ......... 340/870.08 |
| 5,821,864 A | | 10/1998 | Knop et al. ................. 340/622 |

* cited by examiner

Primary Examiner—Daniel S. Larkin
Assistant Examiner—Katina Wilson
(74) Attorney, Agent, or Firm—Peninsula IP Group; Douglas A. Chaikin

(57) ABSTRACT

A wireless (e.g., radio) system and method for automatic water level maintenance of, e.g., a swimming pool utilizing capacitive liquid level sensing. A reference electrode allows water level sensing independent of the water chemistry or temperature. Capacitive electrodes having areas larger than the reference electrode sense various liquid levels when the liquid covers an area of any sensing electrode equal to the area of the reference electrode. Averaging is incorporated to filter out effects of wind or other disturbances. Upon sensing a given condition, the transmitter transmits a sensed condition to a remote receiver for control of valves and pumps for changing the water level in the pool. The receiver includes safety timers for filling and emptying to protect against equipment failure or communications faults. User selectable identification allows identical such radio systems to operate within proximity to each other. Power saving features are used to extend battery life.

12 Claims, 10 Drawing Sheets

| Water Level | Condition | Flip Flop Output Status | | |
|---|---|---|---|---|
| | | $Q_{FIL}$ | $Q_{STP}$ | $Q_{PMP}$ |
| $>L_4$ | Empty Action Required | 0 | 1 | 1 |
| $>L_3; <L_4$ | Stop fill if filling | 0 | 1 | 0 |
| $>L_2; <L_3$ | Stop pump if pumping | 0 | 0 | 0 |
| $>L_1; <L_2$ | Fill Action Required | 1 | 0 | 0 |
| $<L_1$ | Fill Action Required | 1 | 0 | 0 |
| $<L_0$ | Unit not submerged | Undetermined | | |
FIG. 8
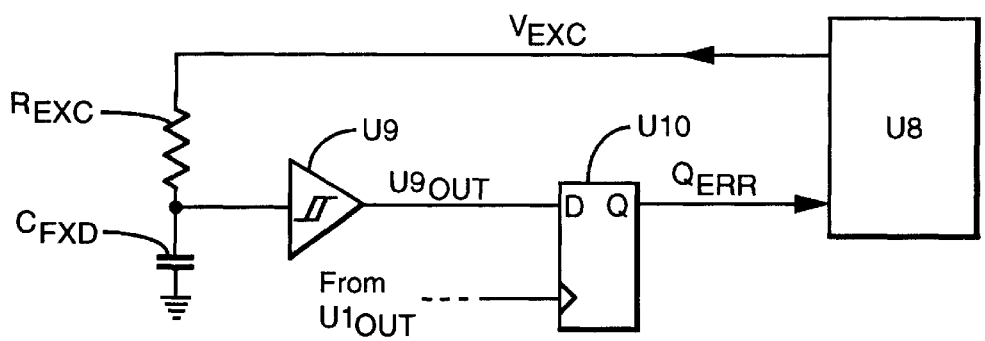
FIG. 9A
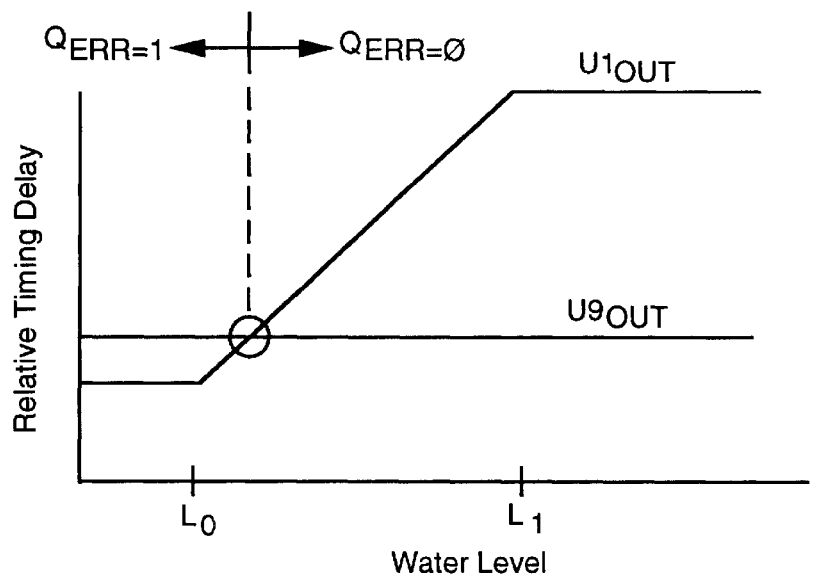
FIG. 9B

WIRELESS SWIMMING POOL WATER LEVEL SYSTEM

BACKGROUND

1. Field of the Invention

The present invention relates to measuring and controlling levels of liquid in a reservoir.

2. Description of Related Art

Numerous patents have addressed the problem of liquid level sensing and swimming pool level maintenance. Page, U.S. Pat. Nos. 3,759,286 and 3,848,627 describes a sensor utilizing conductive probes. Jackson, U.S. Pat. No. 3,939,360 depicts capacitive strips with derivative signal processing. Hile et al, U.S. Pat. No. 4,001,676 discloses the use of a capacitive sensing element compared against a fixed capacitive reference. Hochstein, U.S. Pat. No. 3,863,147 describes a capacitive liquid level sensor using two pair of parallel plate sets, one for sensing and the other for dielectric constant of the liquid. Erath, U.S. Pat. No. 3,863,147 discloses a single element capacitive liquid level sensor using discharge time as a measure for use in a well. Pomerantz et al, U.S. Pat. No. 4,470,008 describes multiple capacitive elements using shunting elements and common electrode immersed in a conductive liquid. Maxhimer U.S. Pat. No. 4,445,238 describes a wired, remote pool level sensor using a fixed time for filling after sensing. Kato, U.S. Pat. No. 4,470,008 teaches the use of dual capacitive elements along with common element using a D-type flip-flop as a phase discriminator and requiring an offset adjusting element. However, none of these offer an easily installable and simple solution to maintaining liquid level.

SUMMARY

The present disclosure is of a system having two main portions: a detector and transmitter (detector/transmitter), and a receiver. The detector/transmitter remotely detects the level of a liquid contained within a vessel, such as the water level in a swimming pool, and transmits information to the remote receiver thus enabling control of valves and pumps to fill or empty the vessel. Advantageously, thus is a wireless (e.g., radio) system so the detector/transmitter is sealed and can safely be immersed in the liquid (e.g., swimming pool.)

The detector portion utilizes multiple capacitive plates, or electrodes, to sense a liquid level. The plates are separated from the liquid by an electrically insulating material, which is chosen to be compatible with the liquid. A single capacitive plate may be used as a common electrode against which the capacitances of the other electrodes are measured, or alternatively, the common electrode may be metallic and placed such that it is immersed continuously in the liquid. This common electrode is connected to the circuit node common of the associated detector processing electronics.

A second electrode (plate) is utilized as a timing reference for other sensing electrodes to measure the liquid level. This reference electrode is totally covered by the liquid while the system is in an operational state.

The surface area of each of the sensing electrodes is larger than that of the reference electrode such that when the liquid level covers an area of a given sensor electrode equal to the area of the reference electrode, the capacitances of the reference and sensor electrode are equal. The detector portion electronics sense the condition of the liquid level being either less than or greater the point where the capacitances, i.e. immersed surface areas, are equal.

With multiple electrodes arranged vertically, various liquid levels may be sensed. Properly oriented, this system of capacitive electrodes can be used to control a zone of liquid level such that when the level decreases to a certain point the detector/transmitter signals the receiver, causing a valve to open, filling the reservoir from a makeup source. When a second predetermined level is reached, again sensed by the detector/transmitter, the receiver is signaled to close the valve, thus ceasing the filling of the reservoir.

Conversely, the system can detect on overfull condition if the liquid reaches too high a level due to circumstances outside the control of the liquid level detection system, such as due to rain. The receiver can be signaled of this overfull condition which then causes a drain valve, pump or other mechanism to operate to decrease the liquid level until a second condition is sensed causing this emptying to halt.

The system need not use both fill and empty mechanisms. A simple system for auto-filling only would then not require either the electrode or electronics for the auto-empty function.

Also provided is a reed switch inside the detector/transmitter housing which when activated by a magnet held externally to the housing but in proximity to the switch puts the detector/transmitter into a test mode; this preserves the watertight integrity of the housing.

BRIEF DESCRIPTION OF THE DRAWINGS

FIG. 8 is a chart showing various liquid level conditions and the detection results therefrom.

FIG. 9A is a partial schematic diagram of an additional circuit to correct for a non-immersed condition.

FIG. 9B is a timing diagram of the non-immersion detector.

DETAILED DESCRIPTION

Figure 1A:
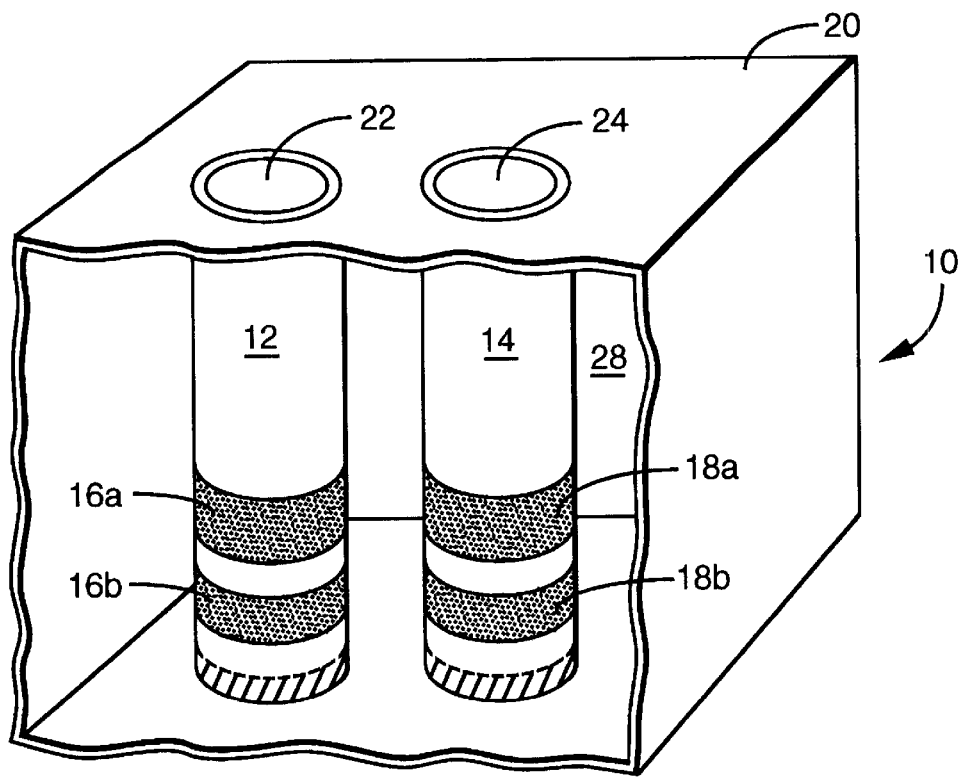
FIG. 1A shows a cutaway view of the detector/transmitter housing, having two vertical tubes, each having two electrodes.

Referring to FIG. 1A, a cutaway perspective view is shown of one embodiment of a detector (sensor) assembly 10. Two vertical tubes made of insulating and non-water adsorbent material are shown, each having two metallic electrodes 16a, 16b and 18a, 18b extending around its outer diameter. The tubes 12, 14 are contained within a waterproof housing 20 such that the top and bottom of the tubes 12, 14 are hermetically attached to the top and bottom of the housing 20 respectively with each tube's inside diameter 22, 24 being open to the outside of the housing 20. The tubes 12, 14 outer diameter is sealed to the inner surface of the housing 20 at both ends of both tubes 12, 14. Thus, when the housing 20 is immersed in water, the water level rises in each tube 12, 14 to a point that would be equal to the level of the water on the outer surface of the housing 20. The interior 28 of the housing 20, contains (not shown here) the detector electronics and transmitter. The interior of the tube is smooth and easily cleaned.

Figure 1B:
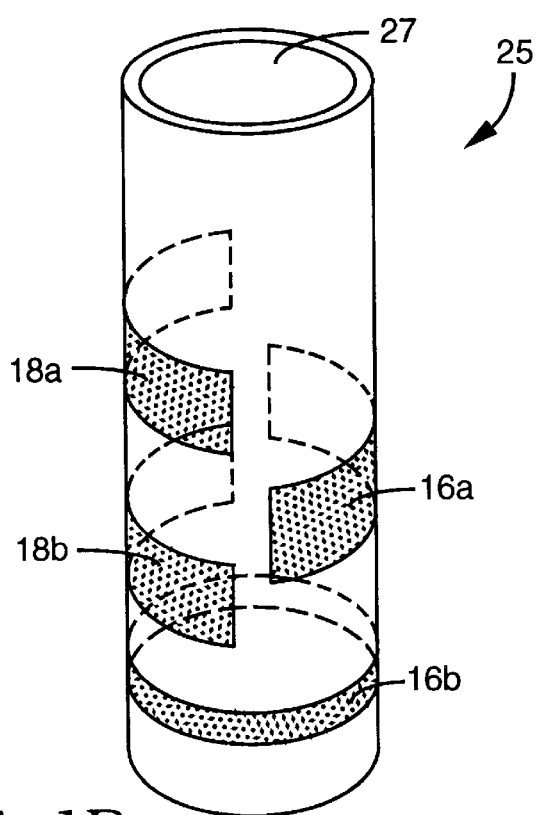
FIG. 1B shows another embodiment of the detector having a single vertical tube.

FIG. 1B shows another embodiment of the detector assembly, which here is a single vertical tube 27 of similar material as in FIG. 1A but with all four electrodes 16a, 16b, 18a, 18b, as in FIG. 1A, on the single tube 27. The relationships of the electrode areas in this embodiment are the same as in FIG. 1A. Here electrode 16b fully encircles the tube 27 while electrodes 16a, 18a, 18b only partially encircle the tube 27. Electrodes 16a, 18a, 18b are staggered so as to maintain a small, about 0.5 inch (12 mm) vertical distance between them while still having adequate surface area for sensitivity.

Figure 2:
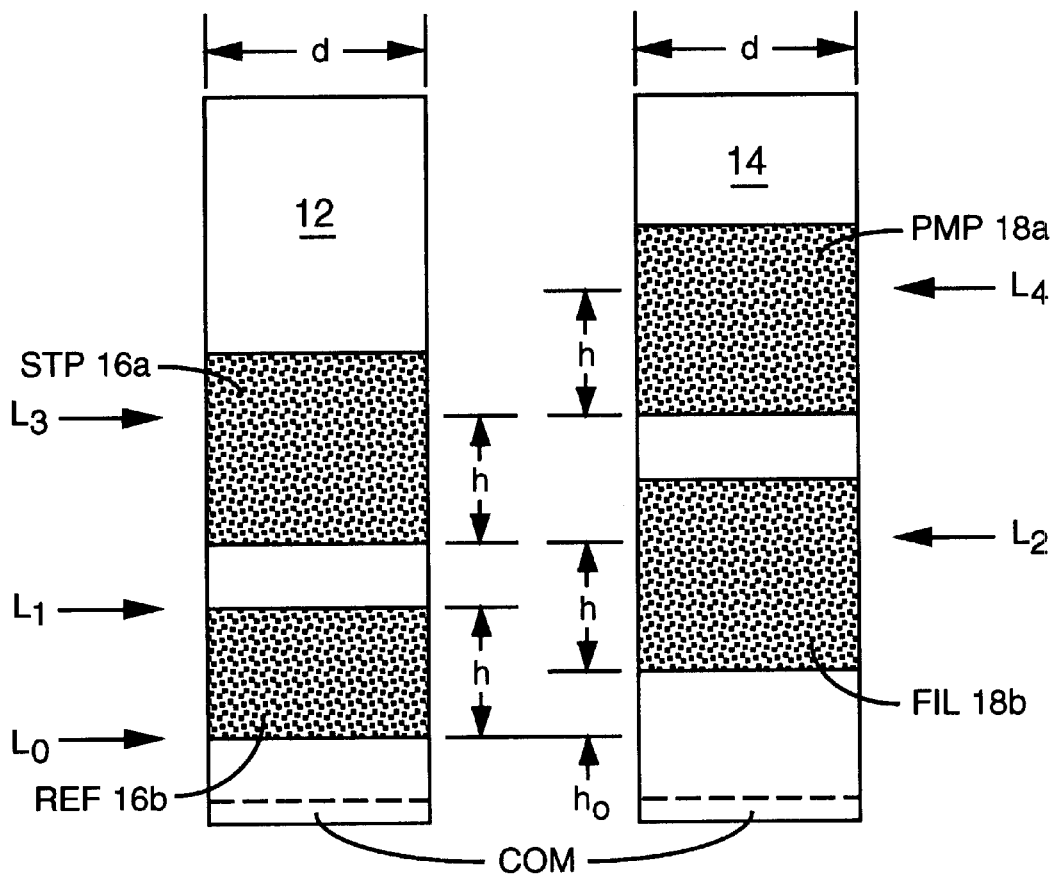
FIG. 2 depicts detail of the electrode configuration of FIG. 1A showing various dimensional relationships.

FIG. 2 shows in a side view the two tubes 12, 14 of FIG. 1A with the four metallic electrodes 16a, 16b, 18a, 18b that wrap around the tubes' outer diameters. The four electrodes 16a, 16b, 18a, 18b here also are labeled (bottom to top) REF, FIL, STP, and PMP representing the REFERENCE, FILL, STOP, and PUMP electrodes respectively. All four electrodes have the same diameter d. Electrode REF has height h. Electrodes FIL, STP, and PMP have heights 1.4 times greater than h in one embodiment. As water rises in the tubes 12, 14 to level $L_1$, the water will just cover electrode REF. When the water level reaches $L_2$, which is at a height of h above the lower edge of electrode FIL, the area covered (immersed) by electrode FIL will be equal to the area of electrode REF, which will be totally covered at this point. The lower edge of electrode FIL is higher than the lower edge of electrode REF by dimension $h_o$, ensuring when the water level is at $L_2$, it will totally cover and be above the upper edge of electrode REF. This offset ensures that the water level at height $L_2$ will be correctly sensed. The total heights of electrodes FIL, STP and PMP being 1.4 times greater than that of electrode REF ensures that the water can cover an area greater than the total area of electrode REF. As the water level reaches levels $L_3$ and $L_4$, a similar equality of equal areas occurs with reference to electrode REF. Sensor assembly 10 is mounted to the side of the pool in any convenient manner, so that it is located at the typical level of the surface of the water. Each tube 12, 14 also shares a common electrode COM shown in FIG. 2.

Two tubes 12, 14 are utilized in the FIG. 1A/FIG. 2 embodiment to allow levels $L_1$, $L_2$, $L_3$ and $L_4$ to be close to each other vertically while maintaining dimension h to be sufficiently large as to give adequate sensitivity. In one embodiment, dimensions d and h are 0.5 inches (12.7 mm) with the dimensions $L_3$–$L_2$ also equal to 0.5 inches (12.7 mm). This establishes what is called here the water level filling hysteresis zone. Similarly, dimensions $L_4$–$L_3$ each equal 0.5 inches (12.7 mm) and set the water level empty hysteresis zone. The wall thickness of the vertical tubes equals 0.02 inches (0.5 mm) and is directly related to sensitivity, as the thinner the wall, the greater the change in capacitance from non-covered to fully covered with liquid. This must be traded off against suitable materials with cost, availability and hydroscopic performance in mind. High quality fiberglass tubing material was found to be suitable and compatible with the epoxy material used for both sealing and mechanical attachment to the housing 20. The FIG. 1B embodiment would have somewhat similar dimensions as that of FIG. 2.

Figure 3A:
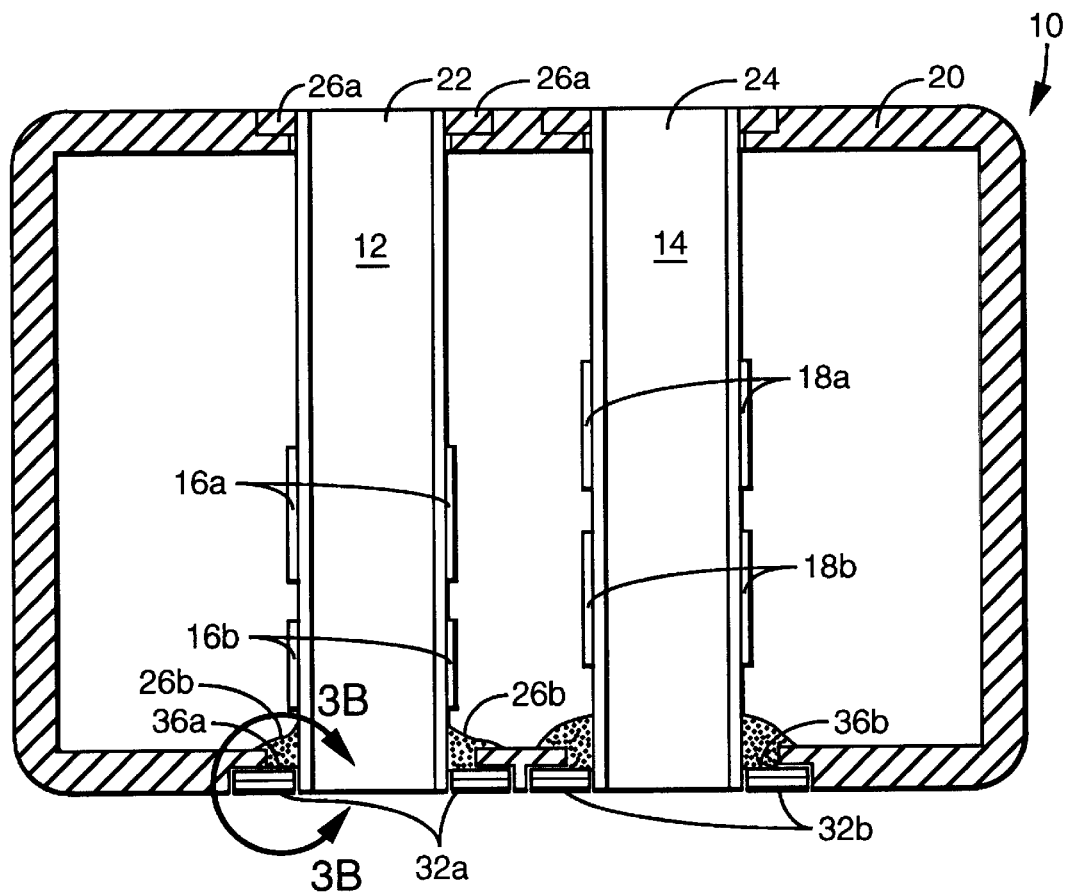
FIG. 3A is a section drawing of the sensor tube assembly of FIG. 1A, with FIG. 3B showing an inset detail of the tube, common electrode with its wire connection and epoxy seal.

FIG. 3A shows a section drawing of the detector assembly 10 and the attachment of the tubes 12, 14 to the housing 20. The top of each tube 12, 14 fits closely into holes in the top surface of the housing 20 with an epoxy seal 26a, with a recessed area with a diameter larger than the outer diameter of the tubes 12, 14 and cut partially into the outer surface of the housing 20. The bottom of the housing 20 has similar holes whose diameter is slightly larger than the outer diameter of the tubes 12, 14 to allow for epoxy material 26b to have a recess to flow into to form both a bond and seal. A second shallow recess around the tubing openings on the outer surface of the bottom of the housing 20 with a diameter larger than the hole for the epoxy 26b allows a metallic washer 32a to be recessed flush with the outer surface of the housing 20. This washer is the common electrode COM also labeled 32a. Stainless steel is a suitable material for washer 32a to prevent corrosion. Electrical connection from washer 32a to the remainder of the circuit is made via a wire 36a attached to the washer 32a and embedded in the epoxy 26b. A similar common electrode washer 32b is provided for tube 14, with associated wire 36b.

Figure 3B:
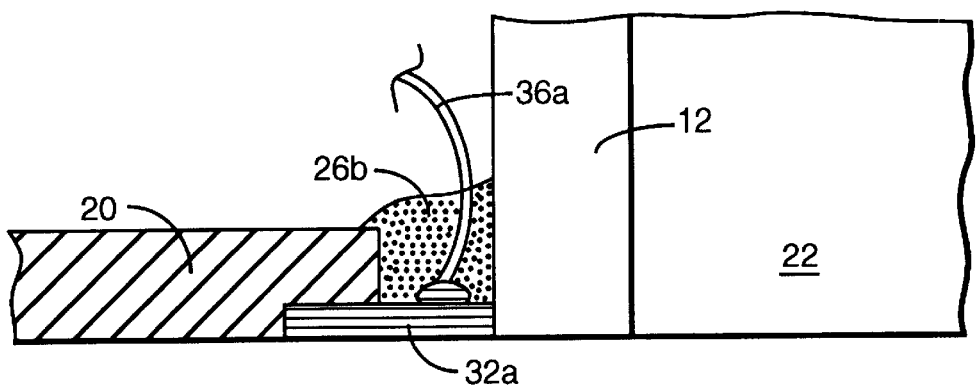

FIG. 3B is a detailed inset of the epoxy seal 26b area 3B (see FIG. 3A) at the bottom of tube 12. The epoxy 26b is used to provide both mechanical attachments of the tube 12, common electrode washer 32a and housing 20 as well as a waterproof seal from the interior of the housing 20 to its exterior.

In the absence of any liquid in the tubes 12, 14, a small parasitic capacitance exists between any electrode, e.g., 16a. and the common electrode 32. As water (liquid) is introduced into the tubes 12, 14 through immersion of the housing 20, the dielectric of the four capacitors defined by electrodes 16a etc. will rise as the water begins to displace the air inside the tubes 12, 14 opposite where the electrodes are. Consequentially, the capacitance of the four capacitors defined by the electrodes (the capacitances being respectfully $C_{REF}$, $C_{FIL}$, $C_{STP}$ and $C_{PMP}$) will also rise linearly and sequentially.

Figure 4C:
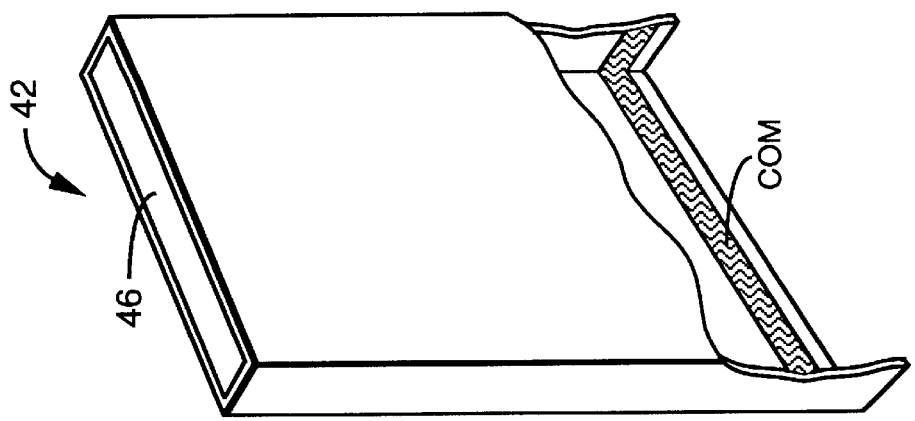
FIG. 4C is the reverse side of the single rectangular cavity with a metallic common electrode at the bottom of cavity interior.
Figure 4B:
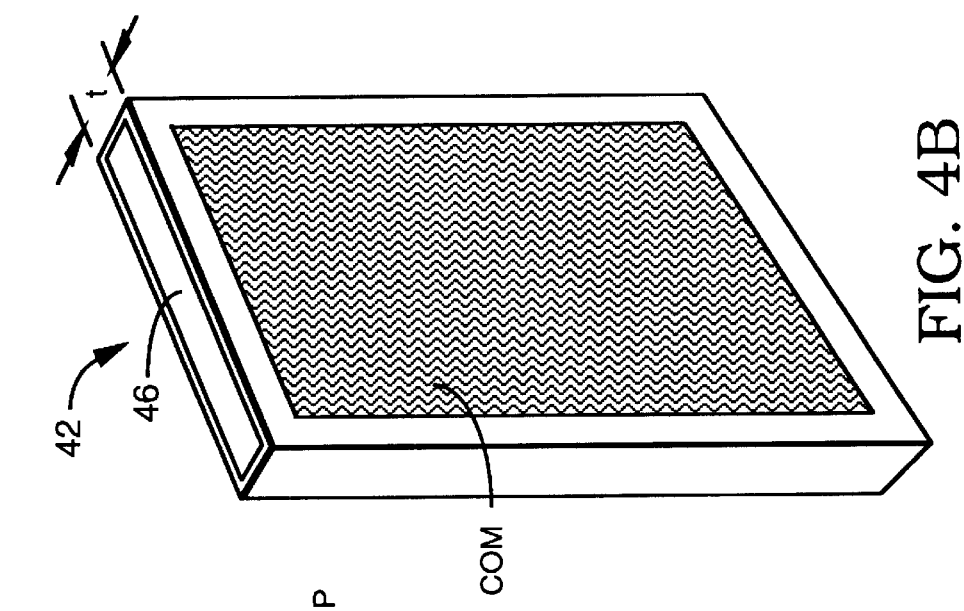
FIG. 4B shows the opposite side of the single rectangular cavity with a capacitive common electrode.
Figure 4A:
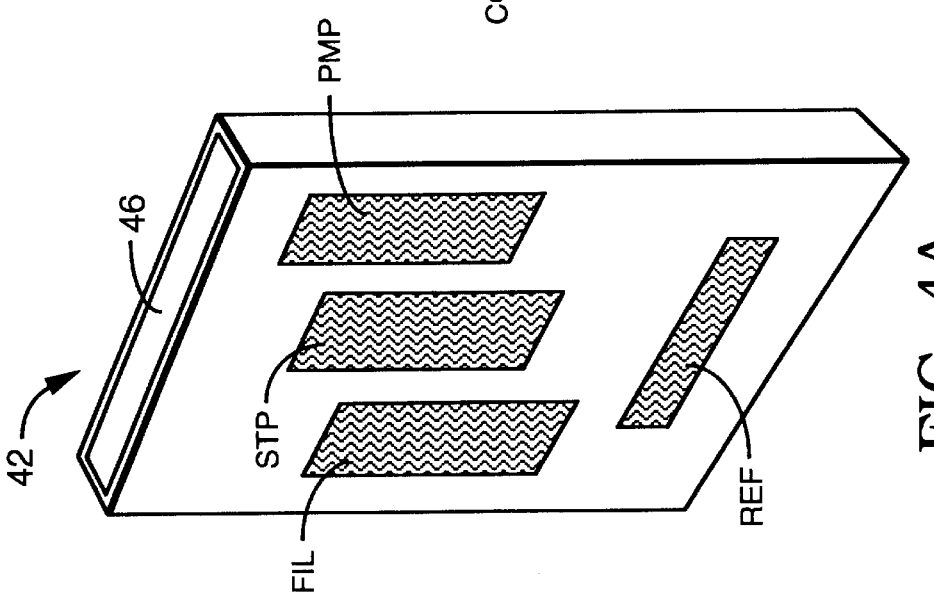
FIG. 4A shows another embodiment of the sensor assembly and electrode system using a single rectangular cavity.

FIGS. 4A, 4B and 4C show another embodiment 42 of the detector assembly. Rather than two tubes as in FIG. 1A, there is a single rectangular vertical tube 46. The exterior surface of one side has all four sensor electrodes: REF, FIL, STP and PMP as in FIG. 4A. The opposite side shown in FIG. 4B has a single common electrode COM on the exterior, electrically connected to the circuit common mode. With a capacitive common electrode, a narrow gap must be present between this electrode and the sensor electrodes REF, FIL, STP, PMP on the opposite side such that there is sufficient capacitance between any sensor electrode and the common electrode COM when liquid is present. The dimension 't' in FIG. 4B has been found to work with dimensions from 0.1 to 1 inch (2.5 mm to 25 mm) with a cavity wall thickness of 0.02 inches (0.5 mm). FIG. 4C is another alternate embodiment of a metallic common electrode COM located on the interior of the tube 46 at the bottom such that it will be directly exposed to the liquid. The liquid is inside the rectangular tube with the top and bottom of the tube hermetically sealed to the upper and lower surfaces of the overall enclosure. This is similar to the two circular tubes of FIG. 1 with the exception that here there is only one tube and it is rectangular. The circuitry is installed exterior to the rectangular sensor tube carrying the liquid but within the overall enclosure.

Figure 5:
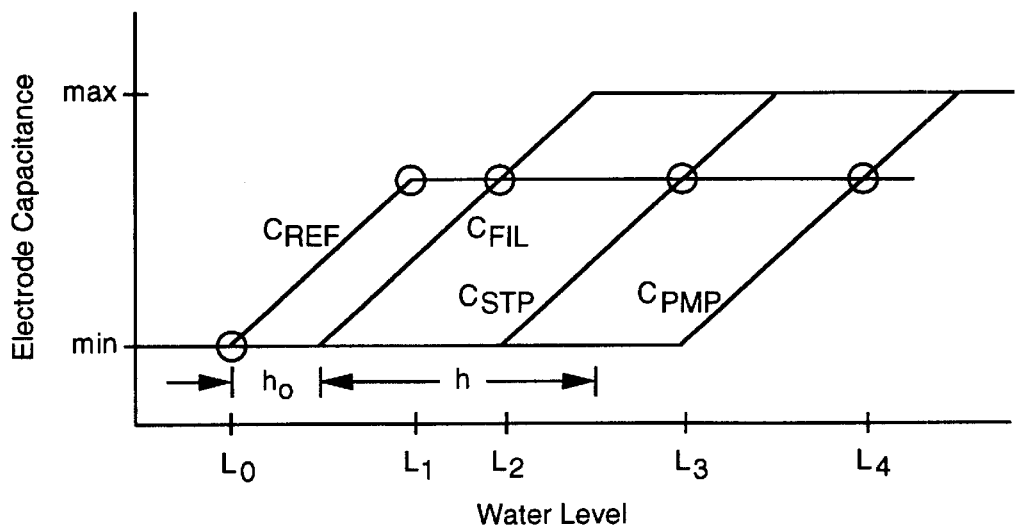
FIG. 5 is a timing diagram of the electrode capacitances versus water level.

FIG. 5 shows graphically the electrode capacitances as a function of water level. At fluid levels less than $L_0$, all electrode capacitances are minimal. As the fluid level rises to level $L_0$, electrode REF is the first to begin to be covered. As the water continues to rise, electrode FIL will begin to be covered and no further increase in the capacitance of the electrode REF will take place. At level $L_2$ the capacitance of electrode FILL will exceed that of electrode REF. With a continued rise in water level, the capacitance of electrode STP and then electrode PMP will also exceed that of electrode REF at levels $L_3$ and $L_4$ respectively.

Figure 6:
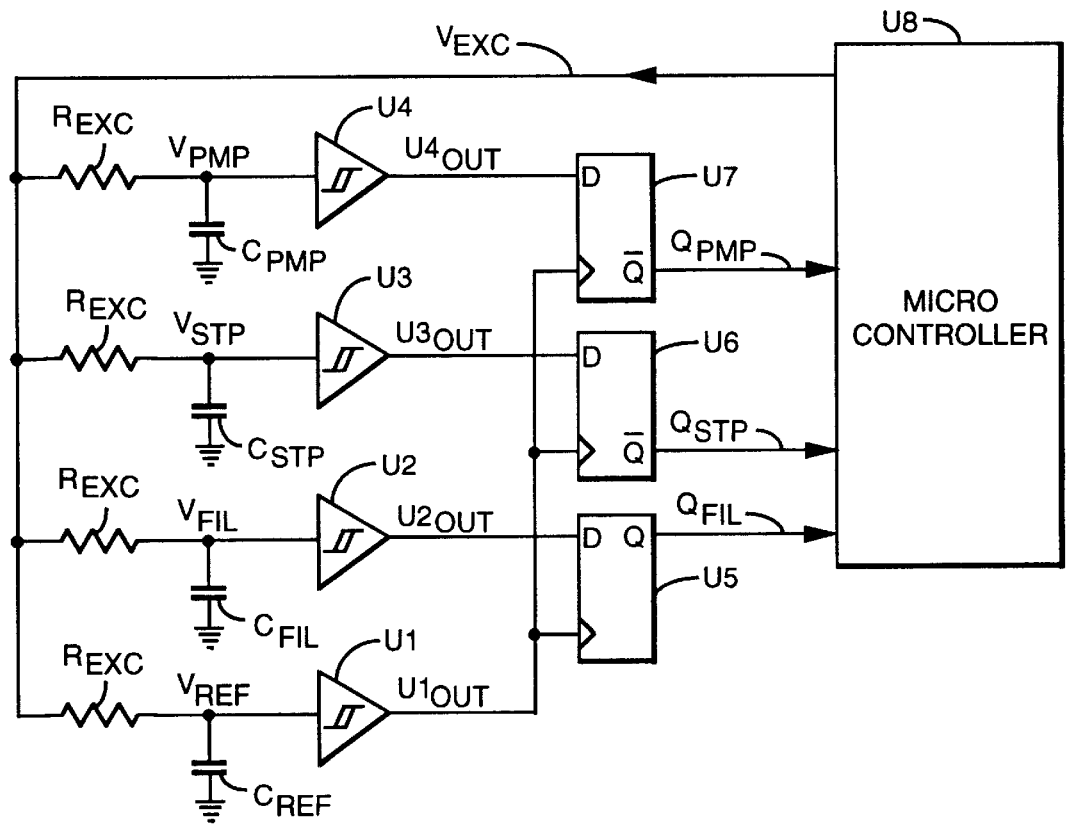
FIG. 6 is a schematic diagram of the detector electronics.

FIG. 6 is a simplified schematic diagram of the associated detector circuitry. Each of the four electrode capacitances, $C_{REF}$, $C_{FIL}$, $C_{STP}$ and $C_{PMP}$, is comprised of two plates: one of the four electrodes described above and the common electrode COM. Each electrode capacitance is connected to a resistor $R_{EXC}$, and to a Schmidt trigger U1, U2, U3, U4. The other connection to all four resistors is a circuit node $V_{EXC}$, which is an exciting signal supplied from microcontroller (microprocessor) U8. The output of Schmidt trigger U1 is coupled to drive the clock input terminal of three D-type flip-flops, U5, U6 and U7. (Schmidt triggers are circuits that sense voltage levels.) The output signals of the other three Schmidt triggers U2, U3 and U4 are coupled to drive the data input terminals of the three flip-flops U5, U6 and U7 respectively. The output terminals of flip-flops U5, U6 and U7, labeled $Q_{FIL}$, $Q_{STP}$, and $Q_{PMP}$ respectively, are connected to input terminals of microcontroller U8.

In operation, signal $V_{EXC}$ is a 12.5 $\mu$Sec duration positive going pulse with a $\frac{1}{16}^{th}$ duty cycle ensuring the electrode capacitances are fully discharged prior to repeating the cycle. This is an excitation period of 200 $\mu$Sec (a frequency of 5 KHz.) Assuming that all four capacitances $C_{REF}$, $C_{FIL}$, $C_{STP}$ and $C_{PMP}$ are completely discharged, each resistor $R_{EXC}$ goes positive the voltages at the R-C nodes $V_{REF}$, $V_{FIL}$, $V_{STP}$ and $V_{PMP}$ will start to rise exponentially. When these voltages reach the positive threshold voltage of the respective Schmidt triggers U1, U2, U3, U4, the output signal of each of the Schmidt triggers U1, U2, U3, and U4 will change state. It is the timing relationship of the resulting signal, $U1_{OUT}$, $U2_{OUT}$, $U3_{OUT}$ and $U4_{OUT}$ that is used to determine the operation of the system.

Figure 7A:
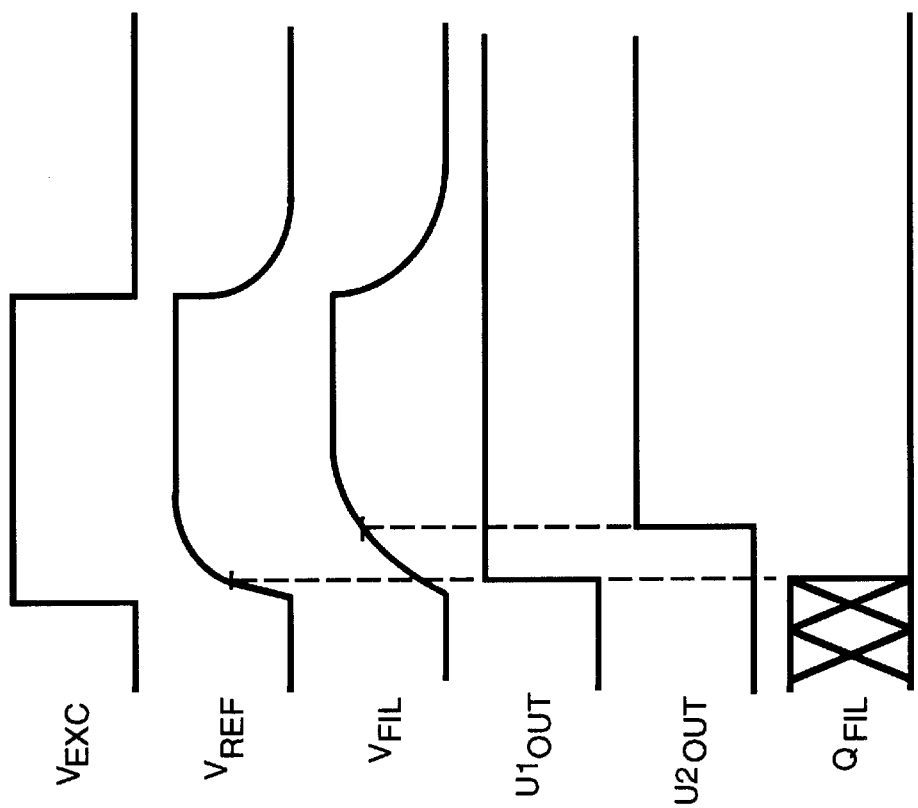
FIGS. 7A and 7B are waveforms of the detector signals showing two different conditions.
Figure 7B:
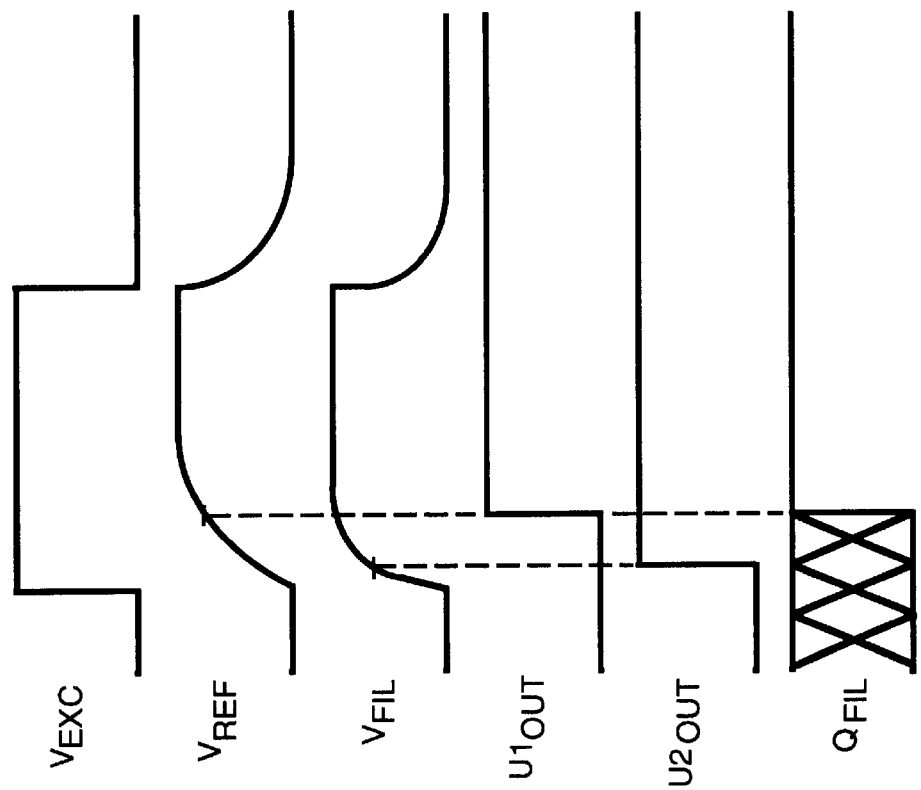

FIGS. 7A and 7B show this sequence in timing diagrams. FIG. 7A depicts a situation where the capacitance of $C_{REF}$ is larger than $C_{FIL}$ and thus takes a longer time for $V_{REF}$ to reach the Schmidt trigger threshold than $V_{FIL}$. Thus $U1_{OUT}$ will occur after $U2_{OUT}$. As $U1_{OUT}$ is the clock signal and $U2_{OUT}$ is the data signal to flip-flop U5, the output signal of flip-flop U5, $Q_{FIL}$, will become a binary one level after the clock signal, regardless of the state prior to the clock signal. FIG. 7B shows this same set of signals except that the two capacitances have been changed with $C_{FIL}$ now being larger than $C_{REF}$. After the clock signal, $Q_{FIL}$ will now be a binary zero.

Note that the flip-flop's clock signal is derived from the capacitance $C_{REF}$ of electrode REF. The timing of this clock signal with respect to the $V_{EXC}$ rising edge is dependent on the conductivity and secondarily on the temperature of the water present in the sensor tubes 12, 14. With higher conductivity water the capacitance between the common electrode and any other electrode will be greater than with lower conductivity water. However, the various water levels are sensed by the water area covering the three electrodes, FIL, STP and PMP with respect to the area covered by electrode REF. It is the ratio of the water area covering the REF electrode to the area covering one of the other electrodes that is sensed. The REF electrode being totally covered, and thus having fixed timing when the FIL electrode (or either of the remaining two electrodes) reach the point where the water level covering them is equal in area to the REF electrode area, allows the system to accurately and repeatably sense the various water levels in the sensor tubes independent of the water chemistry and temperature.

The other electrode capacitances are similarly processed. FIG. 8 is a chart showing the four unique states of the flip-flop U5, U6, U7 output signals $Q_{FIL}$, $Q_{STP}$ and $Q_{PMP}$ after a $V_{EXC}$ cycle with various conditions of the water level in the sensor tubes 12, 14. The various water levels are sensed as being either greater than or less than a certain point. The logical output signals of the three flip-flops U5, U6, U7 determine the region of water level sensed. For example, when the water level is above than point $L_1$ but lower than $L_2$, the flip-flop output signals are 1,0,0 respectively. The microcontroller U8 then decodes this sequence and transmits to the receiver (shown below) the signal to fill the pool. As the pool is being filled the water level in the tubes 12, 14 is rising and when it reaches the point where the water level exceeds $L_3$, this change in condition is once again sensed by the flip-flops U5, U6, U7 with the microcontroller U8 decoding and enabling the transmitter to send the command to cease filling. Note that it is the water level traversing through a certain level that is sensed and not the actual level itself. This process establishes zones of activity or inactivity, depending on the prior zone that was sensed. This process is shown in FIG. 8 by noting that when the system has been in a 'filling' mode, the water level increasing beyond level $L_3$ will cease the filling activity but if the system had been in a 'pump' (or emptying) condition, the water level dropping below level $L_3$ will cease the pumping activity. In both cases, the water level crossed the $L_3$ level and the operation being performed prior to this crossing determines the subsequent operation.

Microcontroller U8 is of conventional type and executes a conventional program (firmware) to decode the input signals and provide suitable commands to the fill and pump mechanisms in response. Coding such a program is well within the skill of one of ordinary skill in the art in light of this disclosure. The program also caries out the functions described below. The filling is accomplished by actuating electrically the valve conventionally present to admit water into the pool (reservoir) in the case of a swimming pool. Pumping is similarly accomplished by actuating electrically the main pool circulation pump that pumps water from the pool, or in the case of a pool (e.g., above ground) suitable for gravity drainage, the pumping involves electrically opening the conventional drain valve.

Averaging is used to minimize any false fill or pump detection. Part of this averaging is taking measurements spaced out in time. This coincides with the need to conserve power to prolong life of the batteries (not shown) powering the circuit of FIG. 6. The microcontroller U8 has a conventional sleep mode whereby it ceases all operations with the exception of a very low power internal timer. Using this sleep mode along with additional conventional firmware timers allows the system to power up, e.g., every 12 minutes. Once powered, a series of 32 measurements are made with the requirement that 30 of the 32 fill, stop or pump signals must be the same for any data change to take place. When this occurs, a firmware accumulator in microprocessor U8 is advanced by one. If there is less than 30 such signals, the accumulator is reset to zero. After seven sequential accumulator advances, which require 84 minutes, the detected action is transmitted to the receiver. The foregoing circumstances required to detect valid action minimizes any false detection due to wind or other conditions.

Once a validated fill detection has occurred, the sensor system powers up every minute from the sleep mode with three sequential stop signals required for a valid stop detection. Minimally, this requires only three minutes for a valid stop detection versus the eighty-four minutes minimally required for a valid fill detection, thus allowing minimal time after a stop detection for overfill. The same detection criteria is used to stop the pump after an empty command (if used.)

The condition where the water level is less than $L_0$ is shown as undetermined in FIG. 8. This is due to the fact that in this state, no water is covering any electrode (other than perhaps the common electrode COM). When this occurs, the timing of the sensor electronics is determined by the parasitic capacitance present on each of the sensor nodes. As this could vary from unit to unit, any certain system's response would be random. If the system needs to be used under these conditions where the sensor housing 20 is essentially not immersed at all, means is provided to solve this unknown condition. FIG. 9A is a partial schematic diagram of an addition to the sensor circuitry of FIG. 6 solving this condition. A fixed R-C network including an additional resistor $R_{EXC}$, and fixed capacitor $C_{FIXED}$, is added so that this R-C network is driven by the $V_{EXC}$ signal the same as any of the other R-C networks of FIG. 6 comprised of the resistors $R_{EXC}$ and the sensor electrode capacitors such as $C_{FIL}$. The junction of this additional R-C network drives the input of a Schmidt trigger U9, whose output signal drives the clock input signal of D-type flip-flop U10. The data terminal (D) of FIG. 9 of flip-flop U10 is driven by the output signal of U1, the REF electrode signal. The value of $C_{FIXED}$ is chosen such that when the electrode REF is not covered by any water, signal $U9_{OUT}$ will be guaranteed to change states after signal $U1_{OUT}$ thus setting flip-flop U10's output signal, $Q_{ERR}$ to a one level indicating this condition. The microcontroller U8, can monitor this signal and in response take whatever action the system designer wishes such as causing a fill action or signaling an error condition. This situation could occur if a pool were being filled from empty or overly low condition. FIG. 9B shows the associated relative timing delay from the leading edge of $V_{EXC}$ to the Schmidt trigger U9 output signal versus the water level.

Figure 10A:
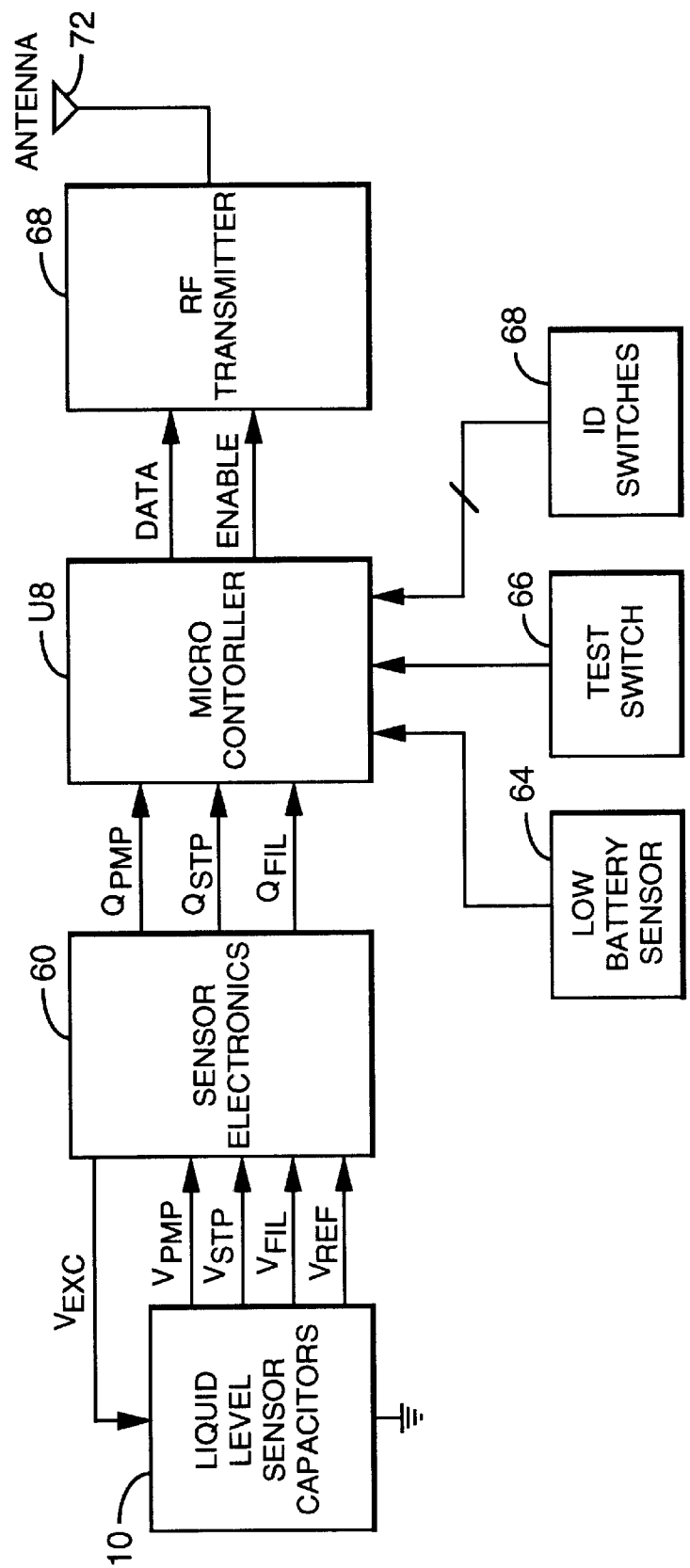
FIG. 10A is a block diagram of the detector/transmitter.

A block diagram of the sensor assembly and associated transmitter including the above-described elements is shown in FIG. 10A. The sensor assembly 10 and associated electronics 60 (including elements U1 to U7 of FIG. 6 and $R_{EXC}$, $C_{FIXED}$, U9, and U10 of FIG. 9B) are described above. The microcontroller U8 accepts the three output signals $Q_{PMP}$, $Q_{STP}$ and $Q_{FIL}$ of the sensor electronics 60 (as in FIG. 6) and drives the sensor electrodes in sensor assembly 10 with the excitation signal $V_{EXC}$. Additionally, the microcontroller U8 monitors a conventional low battery circuit 64 such that when the battery (not shown) voltage drops below a predetermined level a signal is sent to the receiver warning of the condition. Identification (ID) switches 68, numbering four in one embodiment, are read by the microcontroller U8 and when any data is transmitted to the receiver, this user-set ID code is included. With four such switches, sixteen possible combinations exist so that if another such system is within the proximity, the data from the matched transmitter-receiver system can be uniquely identified. This safety feature ensures that another system's commands will not be recognized as legitimate and falsely acted upon. This ID code is sent with every transmission. (This assumes a radio link between the detector and receiver.)

Another switch 66 commands the system to go into a test mode, versus normal operating mode. In the test mode, the system continuously measures the sensors 10, processes and transmits the data. Whereas in the operating mode, the system (via microprocessor U8) wakes up, e.g., about every twelve minutes and then only transmits data if required, in the test mode data is transmitted continuously every two seconds. This allows easier system setup and trouble shooting.

Figure 10B:
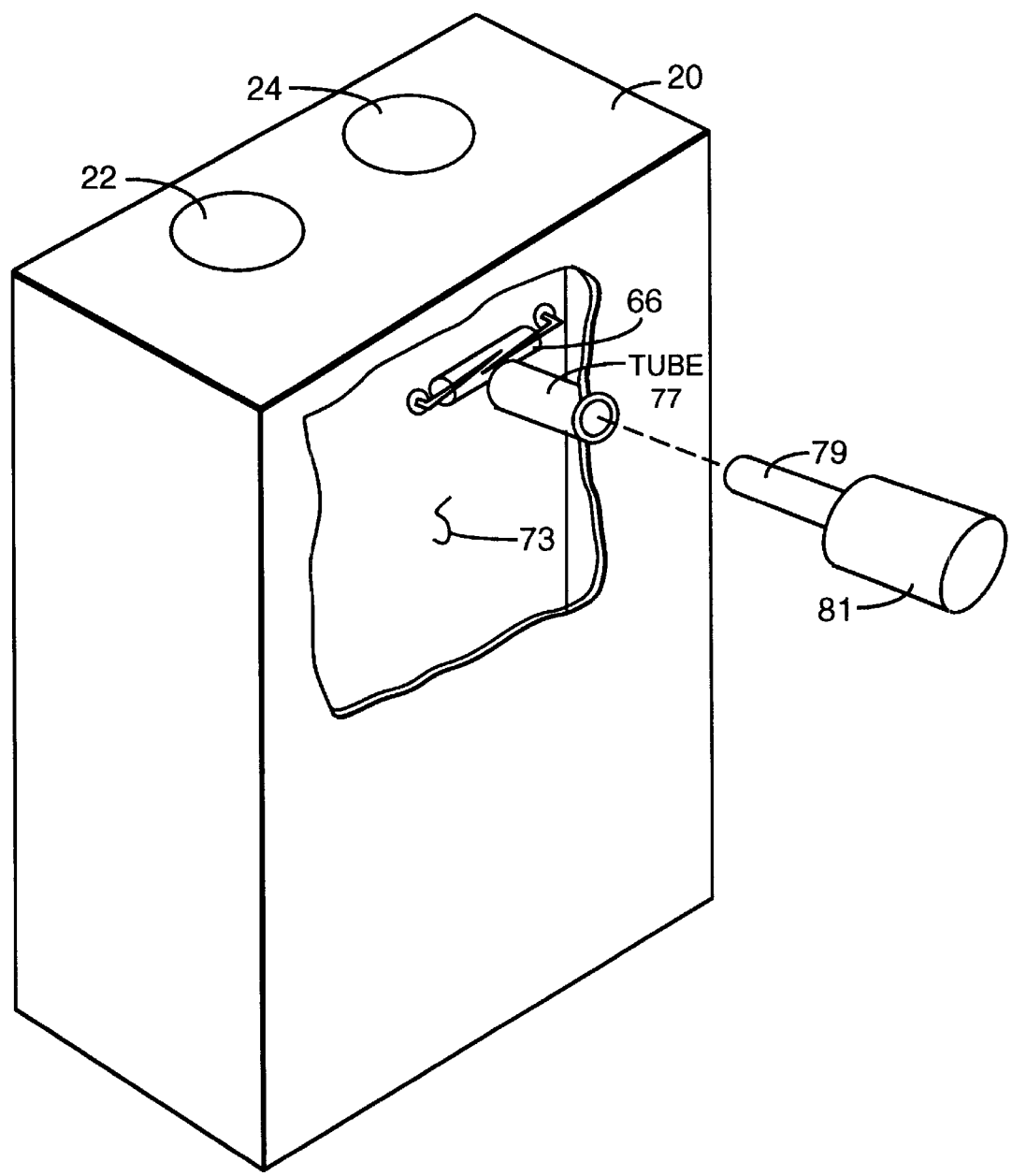
FIG. 10B shows a partial cutaway view of the detector/transmitter housing with a switch to activate the test mode.

The test switch 66 is, e.g., a magnetic reed type on the interior of the housing 20 and is actuated by a magnet from outside the housing 20. This does not require a watertight switch or other sealing and is simple and inexpensive to produce. Low battery sensor 64 is conventional. This is illustrated in FIG. 10B showing the housing 20 of FIG. 1 with tubes 22, 24 but with housing 20 partially cutaway to show its interior including the printed circuit board 73 on which the components (not shown here) of FIG. 10A are conventionally mounted. The above-mentioned reed switch 66 is mounted also on printed circuit board 73. Mounted on the outside of housing 20 is a tube of, e.g., fiberglass bonded by adhesive to housing 20, but not extending therethrough. Separately, a magnet 79 in the shape of a rod about ¼ inch (6 mm) in diameter is provided and having handle 81 about ¾ inch (19 mm) long. To activate switch 66, the magnet 79 is inserted in tube 77, to touch housing 20 and activate switch 66. When not in use, the magnet 79/handle 81 assembly is clipped by a bracket (not shown) to the exterior of housing 20.

Returning to FIG. 10A, the output signals of the microcontroller U8 drive a conventional RF (radio frequency) transmitter 68 and consist of ENABLE and DATA signals on lines so labeled. The ENABLE signal brings the transmitter 68 out of the sleep (powered down) mode and readies it for subsequent transmission. After being enabled, data is sent to the transmitter 68 via the single DATA line. After all data is transmitted, the ENABLE signal powers down the transmitter 68 or puts it back into sleep mode, for power savings to extend the battery life. (A single battery or set of batteries powers the elements of FIG. 10.)

The antenna 72 connected to the transmitter 68 is of a patch type and is wholly contained within the sensor-transmitter housing 20. Antenna 72 is located at the top of the sensor assembly housing 20 such that with the water level at the maximum sensed point, i.e. $L_4$, the antenna 72 operation will not be compromised by being partially or wholly below the water level on the exterior of the housing 20.

Figure 11:
FIG. 11 is a diagram of the transmitted data packet structure.

In one embodiment the transmitter-receiver data structure employs amplitude shift keying (ASK). A binary one is represented with the RF carrier from transmitter 68 being on. A binary zero is represented with the RF carrier being off. This is a well-known technique utilized in a variety of systems such as garage door openers and remote automobile locks. One aspect of this type of data structure is that for optimal operation, an equal number of ones and zeros must be present in the data stream. This ensures that there is no average DC bias so as to cause a possible decoding error in the associated receiver (see FIG. 12). A technique employed to maintain an equal number of ones and zeros is to transmit any given data bit and its inverse. This requires twice the number of data bits than if just the data were sent. However, there is no time constraint on the system's operation, as the water level will change many times slower than the required data transmission time. The data stream, or packet, consists of bits and their inverse representing fill, pump, stop, test and ID contained within two eight-bit words along with a 1½ bit time start, 1 bit inter-word and 1½ bit stop periods. This data structure is shown in FIG. 11. The data rate bit time is about 1 millisecond with an entire data packet transmitted in twelve bit times, or 12 milliseconds. When a transmission occurs, the data packet is repeated four times with a delay of about 25 milliseconds between packets. This redundancy helps ensure the data is received.

Figure 12:
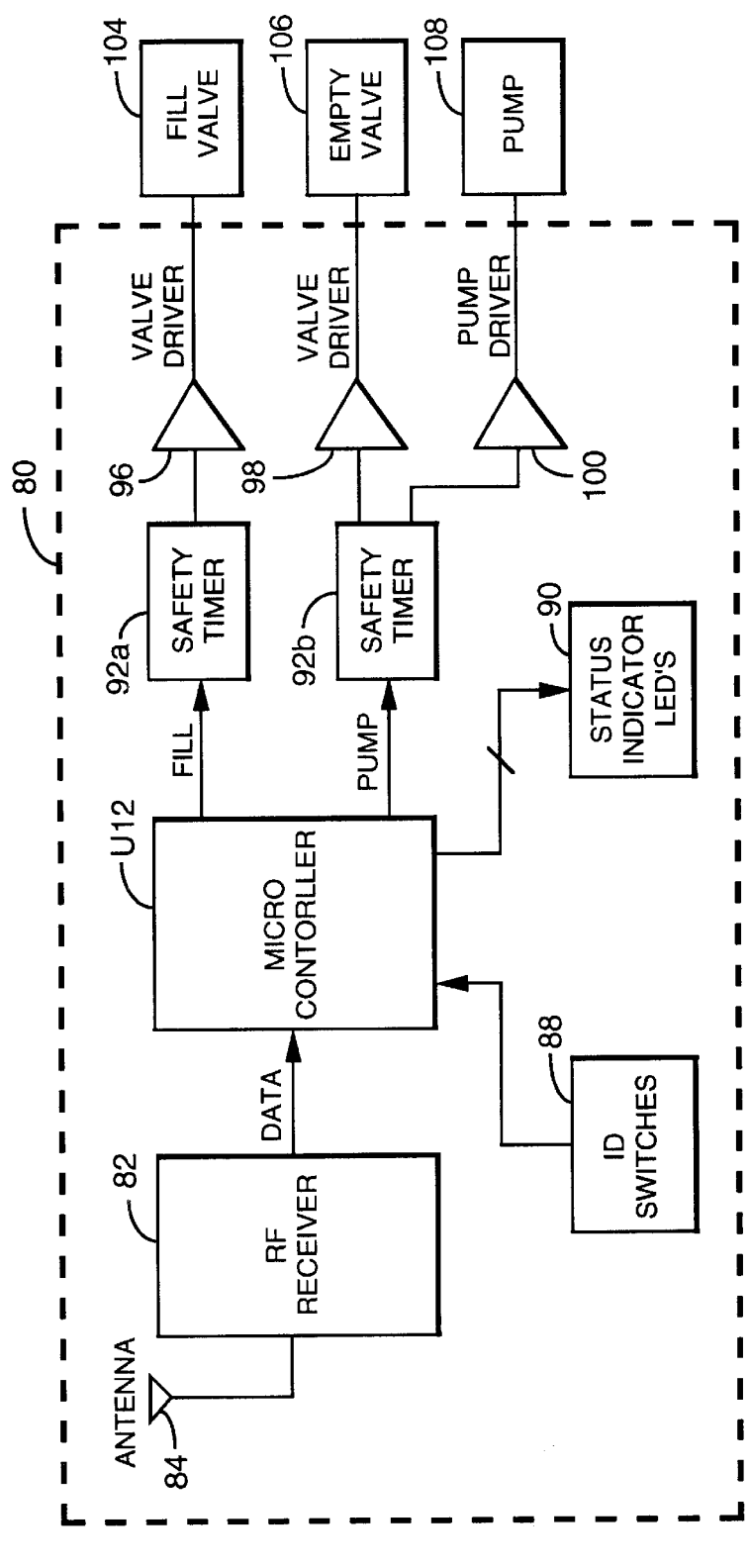
FIG. 12 is a block diagram of the receiver.

The receiver 80, shown in FIG. 12, includes an RF receiver 82 and associated antenna 84 microcontroller U12, ID switches 88, status indicator LED's, two safety timers 92a, 92b and valve and pump drivers 96, 98, 100. The receiver 80 is powered from a conventional small, wall-mounted 110V AC-to-24V AC power supply (not shown) with appropriate rectifiers and voltage regulators. The receiver 80 is continuously on and attempts to decode a data packet when a received signal is detected by RF receiver 82. Several checks must be met prior to accepting any data as valid. First, there must be a 1½ bit time 'one' followed by an ID that matches the ID switch settings in the receiver. Additionally, every data bit must be followed by its inverse. There must be a 1 bit time interval between 8 bit words and lastly, the 1½ bit time stop bit must be present. If all these conditions are met, the data is deemed valid. These checks and the other functionality attributed to the receiver 80 are performed by a computer program executed by the included microcontroller U12, except for the safety timing carried out by safety times 92a, 92b. This program may be routinely coded by one of ordinary skill in the art in light of this disclosure.

If valid data is received by receiver 80 that requires action, the appropriate output signal is activated, such as FILL. Each signal FILL, PUMP enables a respective safety timer 92a, 92b in addition to starting the required action via drivers 96, 98, 100. The purpose of the safety timers is to terminate whatever action was initiated if a valid command to do so is not received within a specified period of time, being caused by interference, failure or other errors. The safety timers 92a, 92b time-out period is adjustable to allow for different system needs with the preferred embodiment having user-selectable periods of 10, 20, 40 and 60 minutes.

The FILL signal is provided to the FILL valve 104 via driver 96. The FILL valve is part of the pool itself and is a conventional electrically operated valve. Similarly the PUMP signal is provided to the conventional pool EMPTY valve 106 via driver 98 and to the conventional PUMP 108 via driver 100. In this embodiment as explained above, the PUMP 108 is always operated at the same time as the EMPTY valve 106 is open, to carry out the pool emptying. Hence both PUMP 108 and EMPTY valve 106 are activated by the same PUMP signal from microcontroller (microprocessor) U12. The PUMP 108 is, e.g., the conventional swimming pool circulation pump. If gravity drainage is available, driving PUMP 108 for pool emptying is not necessary.

The STATUS LED 90 shows system activity such as fill, stop, pump, ID mismatch or other information. Numerous manufacturers including RF Monolithics, Texas Instruments, Micrel and RF Micro Devices supply suitable low-cost matching radio transmitters 68 and receivers 82. Of course, the receiver must be suitably located to detect radio transmissions from the transmitter. Ultrasonic or infrared links may be used instead of a radio transmitter/receiver link.

I claim:

1. A capacitive sensor for determining liquid level, comprising:

a surface adjacent which the liquid is present, and on which the fluid defines a level;

a reference electrode at a lower part of the surface;

a first sensor electrode arranged at least in part above the first sensor electrode and at the surface;

wherein each of the first and the second sensor electrodes have a greater area at the surface than does the reference electrode; and wherein the surface is defined by two passages defined through the sensor and the electrodes are each concentric to one of the passages.

2. The sensor of claim 1, wherein the surface is defined by two passages in the sensor, the reference electrode and the second sensor electrode being concentric to a first of the passages and the first sensor electrode being concentric to a second of the passages, the second sensor electrode extending from below a top of the first sensor electrode to above a top of the first sensor electrode.

3. The sensor of claim 1, wherein the surface is defined by a single passage defined through the sensor and the electrodes are each concentric to the single passage.

4. The sensor of claim 2, farther comprising a third sensor electrode concentric to the second of the passages and extending from below a top of the second sensor electrode to above a top of the second sensor electrode.

5. The sensor of claim 4, wherein the first, second, and third sensor electrodes are respectively arranged to determine that the level of the liquid relative to a nominal level is below the nominal level, at the nominal level, or above the nominal level.

6. The sensor of claim 2, further comprising a common electrode located in each of the two passages below respectively the reference and first electrodes.

7. The sensor of claim 1, further comprising a wireless transmitter coupled to the electrodes, thereby to transmit the determined fluid level to a remote receiver.

8. The sensor of claim 7, in combination with the receiver, wherein the receiver includes at least one driver adapted to actuate a valve.

9. The sensor of claim 1, wherein the reference, first, and second electrodes are arranged on a single surface of the sensor and further comprising a third sensor electrode arranged on the single surface, wherein the second sensor electrode extends from below a top of the first sensor electrode to above a top of the first sensor electrode, and the third sensor electrode extends from below a top of the second sensor electrode to above a top of the second sensor electrode.

10. The sensor of claim 1, wherein each of the electrodes is a plate of a capacitive circuit element, and further comprising a voltage sensing circuit coupled to each of the electrodes, and a flip flop coupled to each of the first and second sensor electrodes and being clocked by the reference electrode.

11. The sensor of claim 1, wherein the electrodes are covered by an insulative layer on the surface.

12. A method of determining a level of a liquid, comprising the acts of:

capacitively sensing a reference level of the liquid;

capacitively sensing a first level of the liquid higher than the reference level;

capacitively sensing a second level of the liquid higher than the first level and sensing the second level before sensing the first level; and wherein a sensed electrical capacitance at the first and the second levels is greater than at the reference level.

* * * * *